(12) United States Patent
Taylor et al.

(10) Patent No.: US 11,352,875 B2
(45) Date of Patent: Jun. 7, 2022

(54) COMBINED POWER SOURCE FOR LONG TERM OPERATION OF DOWNHOLE GAUGES

(71) Applicant: Expro North Sea Limited, Aberdeen (GB)

(72) Inventors: Samuel Keith Taylor, Eastleigh (GB); Alexandra Vasil'Evna Rogacheva, Southampton (GB)

(73) Assignee: Expro North Sea Limited, Dyce (GB)

( * ) Notice: Subject to any disclaimer, the term of this patent is extended or adjusted under 35 U.S.C. 154(b) by 0 days.

(21) Appl. No.: 16/976,947

(22) PCT Filed: Mar. 1, 2019

(86) PCT No.: PCT/GB2019/050589
§ 371 (c)(1),
(2) Date: Aug. 31, 2020

(87) PCT Pub. No.: WO2019/166831
PCT Pub. Date: Sep. 6, 2019

(65) Prior Publication Data
US 2020/0392837 A1    Dec. 17, 2020

(30) Foreign Application Priority Data
Mar. 1, 2018 (GB) .................................. 1803378.7

(51) Int. Cl.
| | |
|---|---|
| *E21B 47/13* | (2012.01) |
| *E21B 41/00* | (2006.01) |
| *E21B 47/00* | (2012.01) |
| *E21B 47/14* | (2006.01) |
| *H02J 7/00* | (2006.01) |

(52) U.S. Cl.
CPC .......... *E21B 47/13* (2020.05); *E21B 41/0085* (2013.01); *E21B 47/00* (2013.01); *E21B 47/14* (2013.01); *H02J 7/0068* (2013.01)

(58) Field of Classification Search
CPC ...... E21B 47/13; E21B 41/0085; E21B 47/00; E21B 47/14; H02J 7/0068
See application file for complete search history.

(56) References Cited

U.S. PATENT DOCUMENTS

| | | | |
|---|---|---|---|
| 4,866,607 A * | 9/1989 | Anderson | E21B 47/12 702/11 |
| 6,061,000 A | 5/2000 | Edwards | |
| 2006/0187084 A1 | 8/2006 | Hernandez-Marti | |

(Continued)

FOREIGN PATENT DOCUMENTS

EP      2434091 A1 *  3/2012  ......... E21B 41/0085

*Primary Examiner* — Amine Benlagsir
(74) *Attorney, Agent, or Firm* — Getz Balich LLC

(57) ABSTRACT

A downhole gauge device for use in a well is described. The downhole gauge device includes one or more electrical systems including at least one measurement means for obtaining measurement data and a data transmitting means configured to transmit measurement data to a receiving station; a first power supply configured to supply a first amount of power to any of the one or more electrical systems; a second power supply configured to supply a second amount of power that is greater than the first amount of power to any of the one or more electrical systems; and means for selectively enabling one or both of the first and second power supply.

16 Claims, 2 Drawing Sheets

(56) References Cited

U.S. PATENT DOCUMENTS

| | | |
|---|---|---|
| 2011/0148656 A1 | 6/2011 | Hudson |
| 2014/0335712 A1* | 11/2014 | Semple .............. H01R 13/5205 |
| | | 439/271 |
| 2015/0346752 A1 | 12/2015 | Storm |
| 2017/0248009 A1* | 8/2017 | Fripp ...................... E21B 47/13 |
| 2017/0271992 A1* | 9/2017 | da Fonseca ............. H02M 1/08 |
| 2019/0089028 A1* | 3/2019 | Leslie .................... E21B 41/00 |

* cited by examiner

COMBINED POWER SOURCE FOR LONG TERM OPERATION OF DOWNHOLE GAUGES

This application claims priority to PCT Patent Appln. No. PCT/GB2019/050589 filed Mar. 1, 2019, which claims priority GB Patent Appln. No. 1803378.7 filed Mar. 1, 2018, which are herein incorporated by reference.

BACKGROUND OF THE INVENTION

1. Technical Field

Described examples relate to systems, methods, and devices for use with wells, such as an oil and gas well, and in particular, systems, methods, and devices for providing measurements of conditions within a well.

2. Background Information

Downhole gauges are placed in wells and used to obtain measurements for transmittal to the surface. Typically downhole gauges take measurements of variables such as temperature and pressure for monitoring conditions within the well. Such measurements are used by well operators to maintain appropriate operation of the well.

Data comprising these measurements is sometimes wirelessly transmitted from a gauge to a surface station. This provides for transmissions to be maintained whilst a gauge is in-hole without requiring a dedicated cabling system or the like. Technologies such as the Expro CaTS™ system may be used to transmit data using electromagnetic waves between a downhole gauge and the surface by utilizing well tubing, structures, or casing as a transmission medium. Alternatively data may be transmitted using other wireless methods such as (but not limited to) by acoustic signals or with flow modulation techniques.

It is not always economically viable for downhole gauges to be physically maintained or otherwise accessible after they have been placed downhole. Therefore, the useful lifetime of a downhole gauge of the type described above is restricted by the capacity of a battery used to power the gauge. Downhole gauges may be required to operate for many years. It is an object of the present invention to provide for an improved useful lifetime for a downhole gauge.

SUMMARY OF THE INVENTION

According to a first aspect of the invention there is provided a downhole device for use in a well (e.g. a gauge device). The downhole device may comprises one or more electrical systems including at least one measurement means for obtaining measurement data. The device may comprise a data transmitting means configured to transmit measurement data to a receiving station. The device may comprise a first power supply configured to supply a first amount of power to any of the one or more electrical systems; a second power supply configured to supply a second amount of power that is greater than the first amount of power to any of the one or more electrical systems; and, means for selectively enabling one or both of the first and second power supply.

As used herein, any reference to a measurement means may refer to a sensor capable of measuring or detecting a physical property of an environment, in particular, temperature and pressure.

Any reference to a transmitting means may refer to a transmitter or set of transmitting equipment operable to generate and transmit electromagnetic waves carrying signals (either wirelessly or through wires).

Any reference to means for selectively enabling any power supply, or to an enabling means, may refer to an electrically actuated switch for electrically connecting or disconnecting a power supply to power an electrical circuit and/or for engaging/disengaging any power supply.

The invention provides for the first power supply used for low power electrical systems to be separated from the second power supply to be used for high power electrical systems. The use of separate power supplies that are selectively enabled provides for power to be used efficiently by the downhole gauge device since each power supply is optimized to meet the differing power demands of different electrical systems. For example, in many systems a relatively large amount of power will be required for the transmitting means compared to a relatively low amount of power required for the measurement means or for systems used to maintain the device in a low-power listening condition.

In one example application, a low-power measurement means may be required to operate at relatively frequent intervals (for example to obtain measurements at a 1 second frequency over a long period of time), whilst operators may only require data to be transmitted using a high-power transmission means at relatively infrequent intervals (for example once a day or on-demand). The first (lower) power supply may continuously supply sufficient power to the low-power systems, whilst the second (higher) power supply will supply power only when required by the high-power systems.

In another example application, the first power supply is used to maintain the device in a "listening" or "dormant" mode during which the device is operable to receive an activation signal to wake up. Once the activation signal is received, the second power supply may be used to enable high-power systems that could include measurement means and/or transmission means.

Optionally, the power supplied by the first power supply is sufficient to power an enabling means to enable or disable the second power supply.

Optionally, the first power supply is configured to supply power to the enabling means to maintain the enabling means in a listening condition for being operable to detect an activation signal and enable the second power supply when the activation signal is detected.

Optionally, the second power supply is configured to power the data transmitting means.

Optionally, one or both of the first and second power supplies are configured to supply power to the measurement means.

Optionally, the one or more electrical systems comprise at least one of a processing means and recording means.

As used herein, the term processing means may refer to a processor such as a central processing unit or logic circuitry operable to control and execute computational operations or instructions. The term recording means may refer to a digital or analogue data recorder operable to record data onto a storage medium such as hard disks, magnetic tapes or solid state memory.

Optionally, one or both of the first and second power supply are operable to be selectively enabled based on a predetermined timing schedule.

Optionally, the downhole gauge device is configured to receive and/or transmit signals.

Optionally, the wireless signals comprise acoustic signals.

Optionally, the wireless signals comprise electromagnetic waves that are propagated via a metallic well structure.

Optionally, the first power supply comprises a power transmission signal comprising an electromagnetic wave that has been propagated via the metallic well structure.

Optionally, the downhole gauge device comprises a rechargeable electrical storage device operable to recharge using power of the power transmission signal.

Optionally, the rechargeable electrical storage device is operable to receive a trickle charge via the power transmission signal.

Optionally, the wireless signals comprise an activation signal. Optionally, one or both of the first and second power supply are configured to be enabled by the activation signal.

Optionally, the second power supply comprises at least one reserve battery that is operable to be enabled and configured to be substantially inert before being enabled.

Optionally, the at least one reserve battery is configured to be activated when the downhole gauge device receives the activation signal, thereby enabling the data transmitting means to transmit data.

Optionally, the one or more reserve batteries comprise at least one thermal reserve or a liquid reserve battery.

Optionally, the first power supply comprises an atomic battery.

Optionally, the first power supply comprises a power generation means that generates power from a flow of fluid through the well.

As used herein, the term power generation means may refer to a power generator operable to generate electrical power. Such a power generator may generate electrical power by converting kinetic or heat energy into electrical energy via the use of turbines, alternators and/or thermoelectric generators.

Optionally, the downhole gauge device further comprises a data receiving means for receiving data transmitted by a second downhole gauge device. Optionally, the transmitting means is configured to transmit the data received by the data receiving means to a third downhole gauge device and/or a receiving station.

As used herein, the term receiving means may refer to a data receiver operable to receive electromagnetic signals that have originated from a transmitter. Optionally, the data receiver decodes such signals into a form that is understood by a device such as a data logger or other processing unit.

Optionally, the downhole gauge device further comprises electronic memory configured to store data obtained by the data measurement means. Optionally, the transmitting means is configured to transmit data stored in the electronic memory.

Optionally, the downhole gauge device is configured to be permanently installed in a well.

Optionally, the downhole gauge device is configured to be installed in an abandoned well.

According to a second aspect of the invention there is provided a communication system for use with a well, the system comprising a downhole gauge device as described in the first aspect; and, at least one receiving station configured to be deployed at a top of the well, and further configured to receive data signals from the downhole gauge device.

Optionally, the at least one receiving station comprises at least one transceiver configured to transmit electrical power to the downhole gauge device via a metallic structure of the well.

Optionally, the at least one surface receiver is further configured to embed an activation signal into a activation-embedded power transmission signal and to transmit the activation-embedded power transmission signal to the downhole gauge device, wherein the downhole gauge device is configured to transmit data to the surface receiver when the downhole gauge device receives the activation-embedded power transmission signal.

According to a third aspect of the invention there is provided a method of operating a downhole gauge device located in a well, the method comprising the step of selectively enabling one or both of; a first power supply of the downhole gauge; and a second power supply of the downhole gauge device to supply a greater amount of power than the first power supply. The method also includes the steps of obtaining measurement data using measurement means and transmitting data to a receiving station using a data transmitting means.

Optionally, the method further comprises the step of powering an enabling means by the first power supply for enabling or disabling the second power supply.

Optionally, the method further comprises the step of powering an enabling means by the first power supply for maintaining the enabling means in a listening condition for being operable to detect an activation signal and enable the second power supply when the activation signal is detected.

Optionally, the method further comprises the step of transmitting an activation signal from a receiving station to the downhole gauge device, wherein at least one of the first and second power supply is enabled when the downhole gauge device receives the activation signal.

Optionally, the first power supply comprises an electrical power transmission signal transmitted to the downhole gauge device from the surface receiver as electromagnetic waves via a metallic structure of the well.

Optionally, the method further comprises the step of embedding the activation signal into the electrical power transmission signal.

Optionally, the method further comprises the step of charging a rechargeable device of the first power supply of the downhole device using the electrical power transmission.

Optionally, the method further comprises the step of transmitting data obtained by the measurement means of the downhole gauge device from the downhole gauge device to the receiving station.

Optionally, the method further comprises the step of transmitting data from the downhole gauge device occurs when the activation signal is received by the downhole gauge device.

Optionally, the method further comprises the step of activating a reserve battery of the second power supply when the activation signal is received by the downhole gauge device.

Optionally, the downhole gauge device is permanently installed in the well.

Optionally, the downhole gauge device is operated in an abandoned well.

The invention includes one or more corresponding aspects, embodiments or features in isolation or in various combinations whether or not specifically stated (including claimed) in that combination or in isolation. As will be appreciated, features associated with particular recited embodiments relating to devices may be equally appropriate as features of embodiments relating specifically to systems or methods of operation, and vice versa.

It will be appreciated that one or more embodiments/aspects may be useful in effective monitoring of a well, and may help monitor conditions accurately during the life of any well.

The above summary is intended to be merely exemplary and non-limiting.

BRIEF DESCRIPTION OF THE DRAWINGS

A description is now given, by way of example only, with reference to the accompanying drawing.

DETAILED DESCRIPTION OF THE INVENTION

Figure 1A:
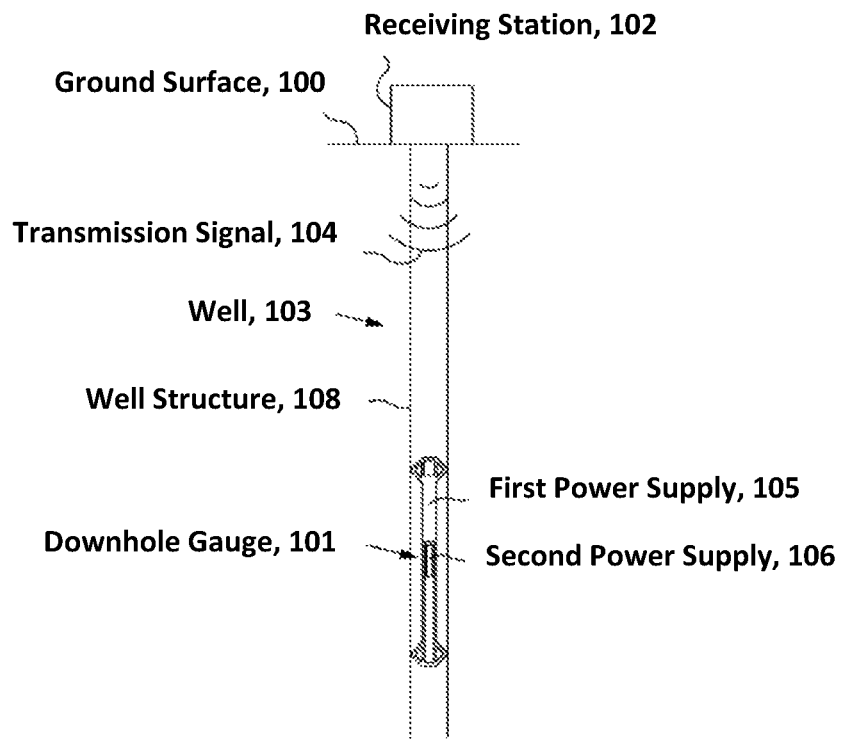
FIGS. 1A-1D show diagrammatic representations of each of four stages of an exemplary method of use of an exemplary device incorporated into exemplary methods and systems according to the invention.

The following examples may be described in relation to oil and gas wells, and in particular production and appraisal wells. The same devices, methods, systems, etc., may be used beyond oil and gas applications. A skilled reader will be able to implement those various alternative embodiments accordingly.

Generally, disclosed herein are devices, methods and systems for efficiently managing the electrical resources available to a downhole gauge device that is operable to obtain measurements of environmental conditions and transmit the measurements to a receiver station. This provides for a downhole gauge to have an enhanced useful lifetime without requiring any further physical interaction with the downhole gauge after it has been sealed downhole.

It will be appreciated given the following examples that the devices described herein may be installed together with a well installation at the time of completion, or indeed deployed later in the lifecycle of a well. In some cases, the devices may be provided during an abandonment process, e.g. in order to monitor well conditions after the well has been abandoned (e.g. as may be required). In any event, in many circumstances the devices may be considered to be deployed permanently in the well, or at least for a significant period of time. In some cases, the devices may be initially installed in the well, and then activated (or enabled further) sometime later—which may be significantly later (e.g. months, years). A skilled reader will appreciate that such long-term deployment may be different from, for example, devices that are not intended to be permanently installed, such as those that may be run as part of a drilling or intervention operation, and then removed from the well.

FIGS. 1A-1D show four simplified representations of a section of a well 103 including a downhole gauge 101. Each of FIGS. 1A-1D represents a condition of communication between a downhole gauge 101 and receiving station 102 for each of four different steps of an exemplary method of powering the downhole gauge.

With reference to FIGS. 1A-1D, a metallic well structure 108 extends from a ground surface 100 to a subterranean formation, as will be appreciated. Such well structure 108 can include conductor, casing and other tubing used to recover product from the formation.

Downhole gauge 101 comprises first power supply 105 and second power supply 106. First power supply 105 is operable to supply power to pressure and temperature sensors (not shown) of the downhole gauge 101. Second power supply 106 is operable to supply power to a transmitting means (not shown) of the downhole gauge 101.

Figure 1B:
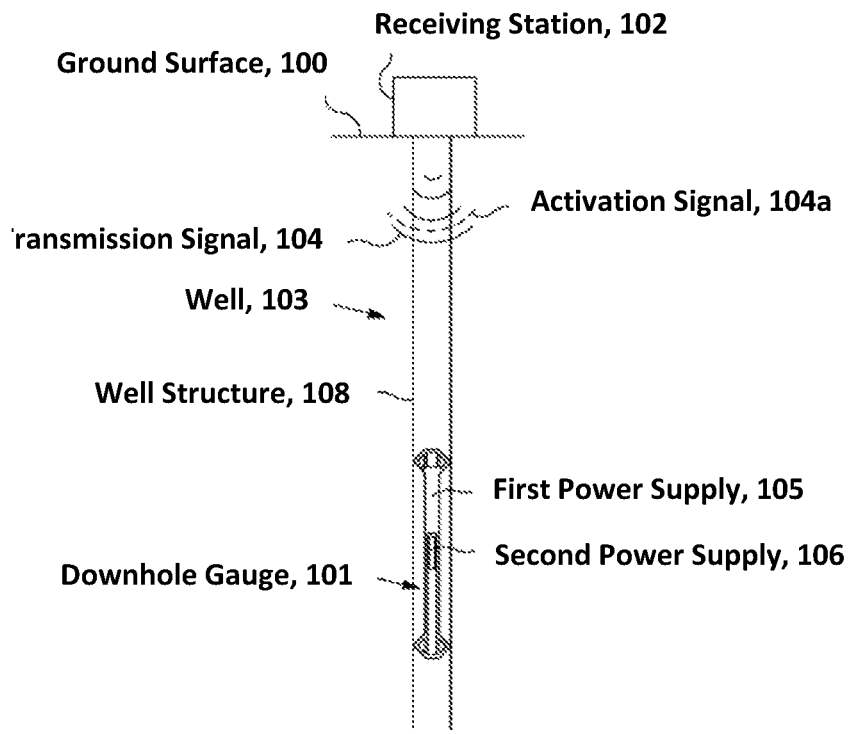
Figure 1C:
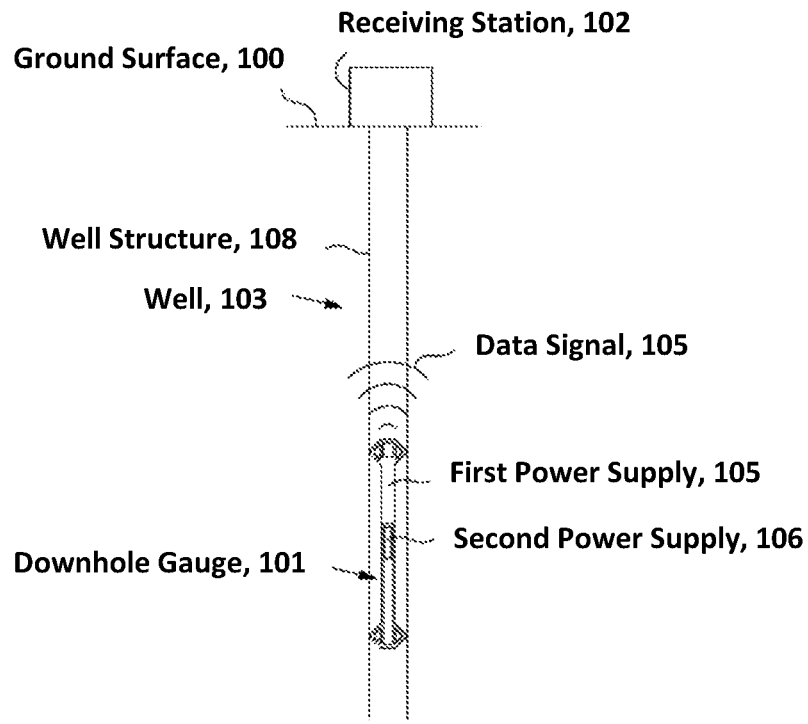
Figure 1D:
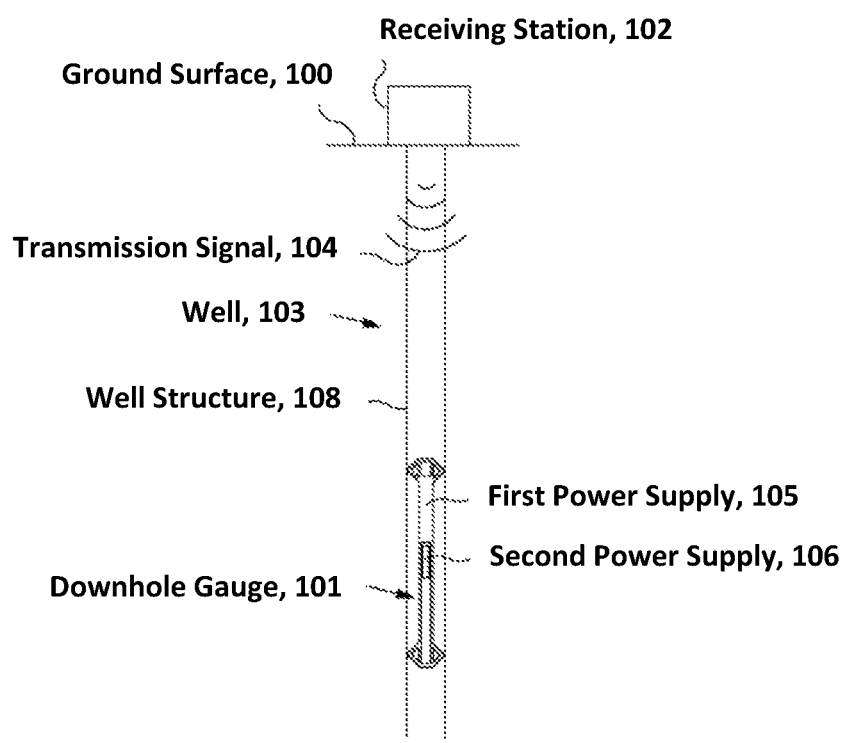

Receiving station 102 is operable to transmit a power transmission signal 104 that is propagated via metallic well structure 108 as shown in FIGS. 1A, 1B, and 1D. In other words, the metallic well structure 108 itself forms the signal path, rather than a dedicated cabling system or the like. Receiving station 102 is further operable to transmit an activation signal 104a as represented in FIG. 1B. The activation signal 104a is embedded into power transmission signal 104. As shown in FIG. 1C, downhole gauge 101 is operable to transmit data signals 107. In the shown embodiment the data signals are propagated via the metallic structure 108. However they could be acoustic signals or any other type of wireless/wired signal. Data signals 107 comprise measurements obtained by sensors on the gauge. These measurements are typically pressure and temperature readings.

A processing means (not shown) within the downhole gauge 101 provides for inbound signals such as the activation signal to be interpreted, and, for measurement data to be converted into a form suitable for transmission as a data signal. In the shown embodiment the processing means is powered by the first power supply, and, in other embodiments may be powered by the second power supply.

A method of powering a downhole gauge will now be described with reference to the FIGS. 1A-1D.

With reference to FIG. 1A, power transmission signal 104 is transmitted to the downhole gauge 101 by receiving station 102. Power transmission signal 104 is propagated via metallic structure 108. Downhole gauge 101 receives the power transmission signal and the power of the power transmission signal is supplied to the first power supply 105. It will be appreciated that there is a significant limitation on the level of power that can be transmitted in this way. The level of power transmitted is limited by factors such as the conductivity and physical properties of the metallic structure of the well. In one embodiment, the power supplied by the first power supply is sufficient to run the measurement means. The first power supply may comprise rechargeable batteries or capacitors that are operable to recharge using the transmitted power. In another embodiment, the power supplied by the first power supply is sufficient to maintain the downhole gauge in a "listening" or "dormant" mode where low-power signal detection systems (not shown) of the gauge are operable to listen for an activation signal.

In some embodiments, the first power supply comprises a nuclear (atomic) battery (not shown) that is utilized in combination with energy provided by the power transmission signal, or, provides power for the measurement means by itself.

In some embodiments, the first power supply comprises a power generation means (not shown) that converts energy obtained from the environment (such as thermal energy or well fluid flow energy) to electrical power for the measurement means.

It will be appreciated that the method described with reference to FIG. 1A can be applied for a significant period of time whilst the downhole gauge 101 is not required to transmit measurements. For example it may be many years after a downhole gauge is sealed in position before it is required to provide measurement readings. Power transmission signal 104 may provide a trickle charge to a battery of the first power supply 105 during this time to ensure that there is always sufficient power available for the measurement means to be initiated at any time.

In this respect, the downhole gauge 101 may be intended to form part of an initial well installation. Furthermore, and as mentioned above, the downhole gauge 101 may form part of an integrated system that may be installed in the well during any stage of production or abandonment of the well for long term deployment. In some cases, an operator need not know at the time of installation of the downhole gauge 101 when it will be required for use.

With reference to FIG. 1B an activation signal 104*a* is transmitted to the downhole gauge 101. In the embodiment of FIGS. 1A-1D, the activation signal 104*a* is embedded within the power transmission signal 104. The activation signal 104*a* may be transmitted in response to a request for data by a user. The second power supply is configured to be enabled when the downhole gauge receives the activation signal 104*a*.

With reference to FIG. 1C, after the second power supply has been enabled, data signals 107 are transmitted by the downhole gauge 101 to receiving station 102. This transmission is powered by the second power supply. It will be appreciated that the data signals 107 can be propagated as electromagnetic signals via the metallic structure of the well, or, data signals 107 could be transmitted by any other known means such as by using acoustic signals.

The second power supply 106 comprises a reserve battery (not shown). The reserve battery has effectively a 0% self-loss. In other words, it minimally discharges during the time before it is activated. Examples of reserve batteries that may be used include thermal or liquid reserve batteries. Typically, the reserve batteries can be activated by one of adding water, electrolyte, or by heating solid electrolyte to a temperature at which it becomes conductive. Use of the reserve battery provides for power to be stored for a long period of time such as over many years. Upon activation of the reserve battery due to the activation signal, power is provided to the transmission means. The reserve battery typically comprises substantially more power than that provided by the first power supply, and, provides enough power to enable a transmission using the transmission means. The second power supply 106 may include a plurality of reserve batteries, each battery being configured to be activated when one or more transmissions are required.

In some embodiments, the second power supply is used to power a high-power measurement means or other systems that require more power than is provided by the first power supply.

It will be appreciated that the invention provides for selectively enabling the first and second power supplies in a method such as that described above. This provides for more efficient usage of available power compared to methods available where there is a single power supply. For example, initiation of a single power supply for both measurement and transmission would result in unfavorable discharge over time of such a single power supply during the time that measurements are recorded, but, transmission is not required.

With reference to FIG. 1D, the downhole gauge has completed transmission of data, and the downhole gauge continues to utilize the first power supply to run low-power systems such as the measurement means and/or signal detection means. When the downhole gauge receives a further activation signal 104*a*, the communication conditions shown in FIGS. 1B and 1C will occur as discussed above.

The methods of communication and downhole gauge discussed above with reference to FIGS. 1A-1D facilitate a variety of advantageous methods and systems for enhancing the usable lifetime of a downhole gauge device 101.

In a further embodiment, the second power supply is enabled based on a timing mechanism (not shown).

In a further embodiment, the downhole gauge comprises electronic memory for storing a collection of measurement data that has been obtained over a period of time. In this embodiment, the downhole gauge device is configured to transmit the collection of measurement data using the transmission means when the activation signal is received.

In a further embodiment, the downhole gauge device is configured to lie in a dormant condition for a long time, such as many months or even years. The power supplies of the downhole gauge device may be initiated by transmittal of the power transmission signal and/or transmittal of the activation signal. It will be appreciated that in such dormant state, there is effectively a 0% loss of power stored in any power supplies, since any reserve batteries of the second power supply are not yet activated.

In a further embodiment, a system according to the invention includes multiple downhole gauge devices including a first and second power supply as described above, wherein some of the downhole gauge devices act as repeaters. For example, a first downhole gauge device is initiated by a signal from the receiving station. The first downhole gauge device transmits a signal for initiating a second downhole gauge device that is located deeper within a well. The second downhole gauge device transmits measurements to the receiving station via the first downhole gauge device using the second power supply of each downhole gauge device.

It will be appreciated that while in the above examples, the systems and methods have been described in relation to gauge devices, e.g. for measuring/communicating P/T data, it will be appreciated that in other examples, the power supply arrangements (e.g. first and second power supplies as described above) may be used for different applications when installed (e.g. permanently installed) in a well installation. A skilled reader will readily be able to implement those alternative embodiments.

Further, the applicant discloses in isolation each individual feature described herein and any combination of two or more such features, to the extent that such features or combinations are capable of being carried out based on the specification as a whole in the light of the common general knowledge of a person skilled in the art, irrespective of whether such features or combinations of features solve any problems disclosed herein, and without limitation to the scope of the claims. The applicant indicates that aspects of the invention may consist of any such individual feature or combination of features. In view of the foregoing description it will be evident to a person skilled in the art that various modifications may be made within the scope of the invention.

What is claimed is:

1. A downhole gauge device for use in a well, the downhole gauge device comprising:
    one or more electrical systems including at least one measurement means for obtaining measurement data and a data transmitting means in communication with the at least one measurement means, the data transmitting means configured to transmit the measurement data to a receiving station;
    a first power supply configured to supply a first amount of power to the one or more electrical systems;
    a second power supply configured to supply a second amount of power to the one or more electrical systems, wherein the second amount of power is greater than the first amount of power; and
    an enabling means in communication with the first power supply and the second power supply and configurable in a listening condition in which the enabling means is operable to detect an activation signal;

wherein the first power supply is configured to supply the first amount of power to the enabling means to maintain the enabling means in the listening condition, and the first amount of power is sufficient to power the enabling means to selectively enable or disable the second power supply; and wherein upon receipt of the activation signal, the enabling means is configured to enable the second power supply to provide the second amount of power to the data transmitting means to transmit the measurement data to the receiving station.

2. The downhole gauge device of claim 1, wherein the first power supply is configured to supply the first amount of power to the at least one of the measurement means, or the second power supply is configured to supply the second amount of power to the at least one of the measurement means, or the first power supply is configured to supply the first amount of power and the second power supply is configured to supply the second amount of power to the at least one of the measurement means.

3. The downhole gauge device of claim 1 wherein one or both of the first and second power supply are operable to be selectively enabled based on a predetermined timing schedule.

4. The downhole gauge device of claim 1 configured to receive and/or transmit wireless signals, wherein the wireless signals comprise at least one of acoustic signals and electromagnetic waves that are propagated via a metallic well structure.

5. The downhole gauge device of claim 4 wherein the first power supply comprises a power transmission signal comprising an electromagnetic wave of the electromagnetic waves that has been propagated via the metallic well structure.

6. The downhole gauge device of claim 5 wherein the first power supply comprises a rechargeable electrical storage device operable to recharge using power of the power transmission signal.

7. The downhole gauge device of claim 6 wherein the rechargeable electrical storage device is operable to receive a trickle charge via the power transmission signal.

8. The downhole gauge device of claim 1 wherein the second power supply comprises at least one reserve battery that is operable to be enabled and configured to be substantially inert before being enabled.

9. The downhole gauge device of claim 1 wherein the first power supply comprises a power generation means that generates power from a flow of fluid through the well.

10. The downhole gauge device of claim 1 further comprising a data receiving means for receiving data transmitted by a second downhole gauge device, and, wherein the data transmitting means is configured to transmit the data received by the data receiving means to a third downhole gauge device and/or the receiving station.

11. A communication system comprising:
at least one receiving station configured to be deployed at a top of a well; and
a downhole gauge device configured to be disposed in the well, the downhole gauge device comprising:
one or more electrical systems including at least one measurement means for obtaining measurement data and a data transmitting means in communication with the at least one measurement means, the data transmitting means configured to transmit the measurement data to the at least one receiving station;

a first power supply configured to supply a first amount of power to the one or more electrical systems;

a second power supply configured to supply a second amount of power to the one or more electrical systems, wherein the second amount of power is greater than the first amount of power; and an enabling means in communication with the first power supply and the second power supply and configurable in a listening condition in which the enabling means is operable to detect an activation signal;

wherein the first power supply is configured to supply the first amount of power to the enabling means to maintain the enabling means in the listening condition, and the first amount of power is sufficient to power the enabling means to selectively enable or disable the second power supply; and wherein upon receipt of the activation signal, the enabling means is configured to enable the second power supply to provide the second amount of power to the data transmitting means to transmit the measurement data to the at least one receiving station; and wherein the at least one receiving station is configured to receive data signals from the downhole gauge device.

12. The communication system of claim 11 wherein the at least one receiving station is further configured to embed the activation signal into an activation-embedded power transmission signal and to transmit the activation-embedded power transmission signal to the downhole gauge device, wherein the downhole gauge device is configured to transmit data to the at least one receiving station when the downhole gauge device receives the activation-embedded power transmission signal.

13. A method of operating a downhole gauge device located in a well, the method comprising:
using a first power supply to supply a first amount of power to at least one sensor and to an enabling means, the at least one sensor configured to measure at least one environmental property within the well and produce measurement data signals;
said measuring the at least one environmental property within the well using the at least one sensor, wherein the measuring of the at least one environmental property produces the measurement data signals representative of the measured at least one environmental property;
maintaining the enabling means in a listening condition using the first amount of power from the first power supply, wherein in the listening condition the enabling means is operable to detect an activation signal;
providing the activation signal detectable by the enabling means;
upon the detection of the activation signal by the enabling means powered by the first amount of power, using the enabling means to enable a data transmitting means to transmit the measurement data signals to a receiving station, the enabling means including supplying a second amount of power from a second power supply to the data transmitting means, wherein the second amount of power is greater than the first amount of power; and
transmitting the measurement data signals to the receiving station.

14. The method of claim 13 further comprising: transmitting the activation signal from the receiving station to the downhole gauge device, wherein at least one of the first power supply or the second power supply is enabled when the downhole gauge device receives the activation signal.

15. The method of claim 13 wherein the first power supply comprises an electrical power transmission signal transmitted to the downhole gauge device from the receiving station as electromagnetic waves via a metallic structure of the well.

16. The method of claim 15 further comprising: embedding the activation signal into the electrical power transmission signal.

* * * * *